United States Patent [19]
Thayer et al.

[11] Patent Number: 5,494,444
[45] Date of Patent: Feb. 27, 1996

[54] METHOD OF SIMULATING FLASHCARDS FOR LEARNING PURPOSES

[75] Inventors: Michael D. Thayer, 105 Arthur St., Garden City, N.Y. 11530; Kenneth A. Tepper, Needham, Mass.; A. David Kelts, Cambridge, Mass.; Colin A. Ross, Brockton, Mass.; Jerry Gulla, Wayland, Mass.; Dragana Ilic, Chestnut Hill, Mass.

[73] Assignee: Michael D. Thayer, Garden City, N.Y.

[21] Appl. No.: 156,786

[22] Filed: Nov. 24, 1993

[51] Int. Cl.⁶ ........................................ G09B 7/00
[52] U.S. Cl. ...................... 434/362; 434/118; 434/323; 273/430
[58] Field of Search .................... 434/112, 118, 434/157, 169, 182, 185, 179, 307 R, 322, 323, 350, 362, 365, 129; 395/159; 364/419.2; 345/112, 146, 157; 273/141 R, 138 A, 296, 429–432

[56] References Cited

U.S. PATENT DOCUMENTS

| | | |
|---|---|---|
| 4,234,933 | 11/1980 | Adelson et al. . |
| 4,247,895 | 1/1981 | Weber ................................... 434/327 |
| 4,764,867 | 8/1988 | Hess . |
| 5,002,491 | 3/1991 | Abrahamson et al. . |
| 5,035,625 | 7/1991 | Munson et al. . |
| 5,100,326 | 3/1992 | Leep et al. ........................... 273/296 X |
| 5,120,230 | 6/1992 | Clark et al. ......................... 434/307 R |
| 5,147,205 | 9/1992 | Gross et al. ........................ 434/179 X |
| 5,169,342 | 12/1992 | Steele et al. ........................ 434/118 X |
| 5,180,309 | 1/1993 | Egnor . |
| 5,205,563 | 4/1993 | Dearing .................................. 273/296 |
| 5,303,042 | 4/1994 | Lewis et al. ..................... 434/307 R X |
| 5,326,270 | 7/1994 | Ostby et al. ............................ 434/362 |

OTHER PUBLICATIONS

Halasz, "Relfections on Notecards: Seven Issues for the Next Generation of Hypermedia Systems", Jul. 1988, Communications of the ACM vol. 31, No. 7, pp. 836–852.

*Primary Examiner*—Joe Cheng
*Attorney, Agent, or Firm*—Joseph W. Berenato, III

[57] ABSTRACT

A method of displaying information for learning purposes comprises the steps of providing within a computer an information set having at least a first information topic. The first information topic includes a plurality of discrete information elements. The discrete information elements are caused to be arranged for display within the computer in a sequence selected from a plurality of predetermined sequences. The discrete information elements are displayed with a display operably associated with the computer in the selected sequence.

18 Claims, 16 Drawing Sheets

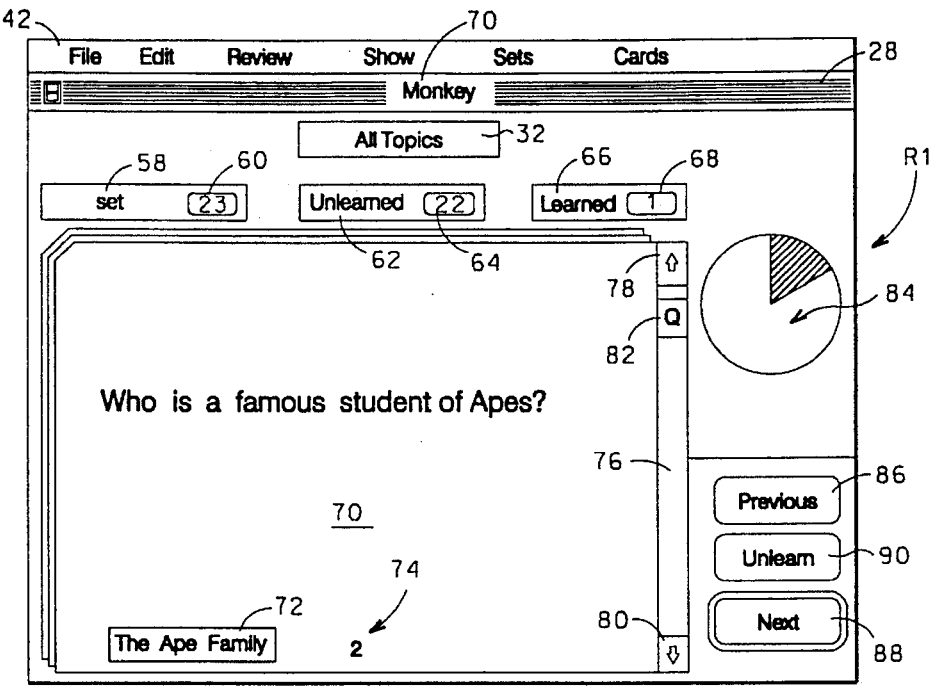

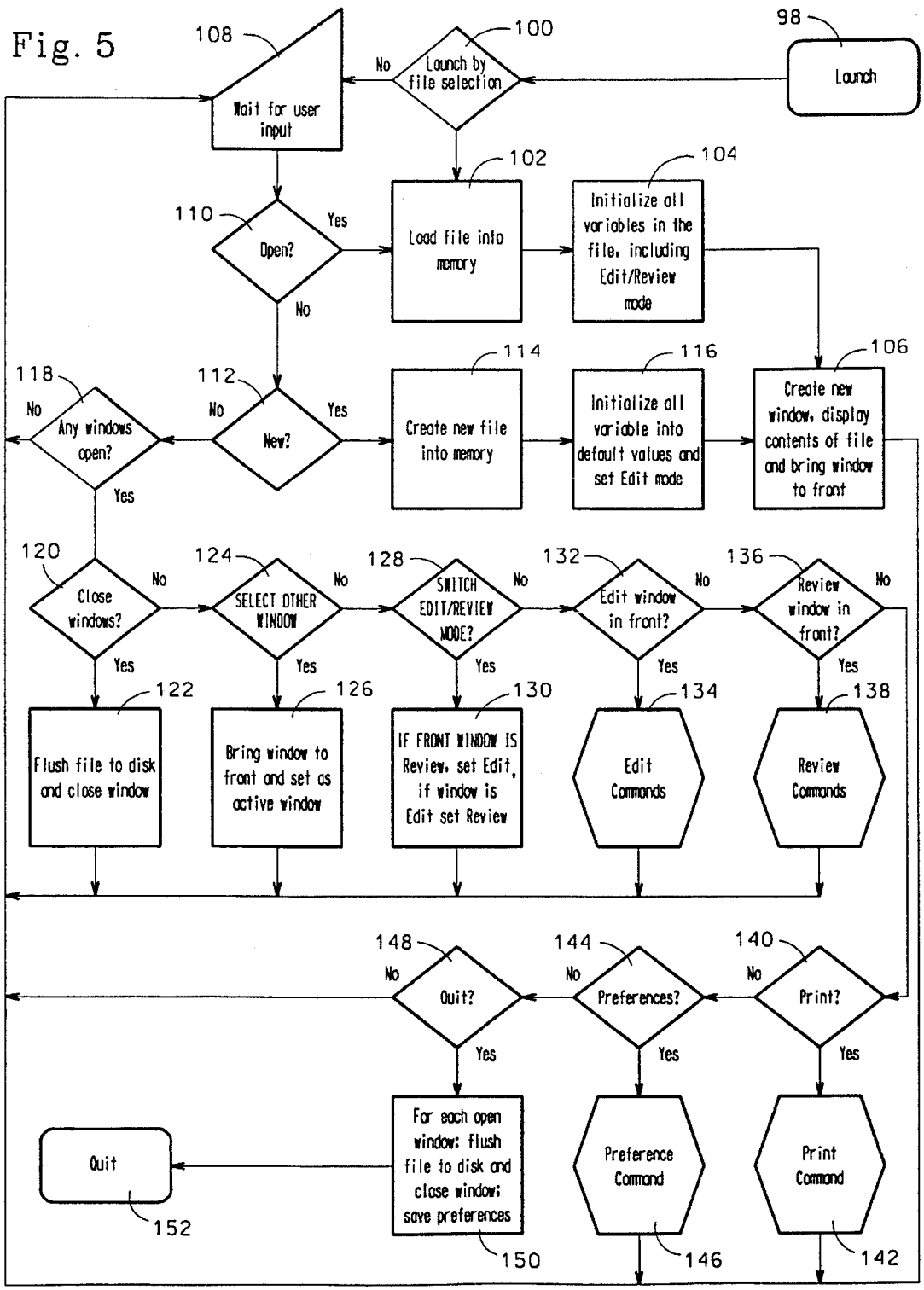

Fig. 16

| File | Edit | Review | Show | sets | cards |

New • N
Open ▶
Close • W

Page Setup
Print • P

Export

Quit • Q

Fig. 17

| File | Edit | Review | Show | sets | cards |

Undo • Z

Cut • X
Copy • C
Paste • U
Clear
Select All • A

Preferences

Find • F
Find Again • G

Fig. 18

| File | Edit | Review | Show | sets | cards |

Edit • E groups ▶    ✓ OFF

4

Combine • B

6

Shuffle
Alphabetical    8
✓ As Entered
                Other

Auto

METHOD OF SIMULATING FLASHCARDS FOR LEARNING PURPOSES

FIELD OF THE INVENTION

The disclosed invention is to a method of simulating flashcards in order to enhance learning. More particularly, the disclosed invention is directed to a computer system which permits a user to input material into a database in "flashcard" form in order to thereafter permit the information to be accessed in a format and sequence selected by the user.

BACKGROUND OF THE INVENTION

Most educational institutions require that the student demonstrate recollection of specific items of information or categories of information. A test or examination is one well-known means by which a teacher establishes whether a student has grasped the information which was communicated during a particular course, seminar, workshop, or the like. Not only must the student establish that categories of information have been learned, but it is also frequently necessary for the student to establish that particular items of information within that category have been learned or memorized. A student may be called upon to demonstrate this recollection on more than one occasion, so there is frequently a need for the student to be able to demonstrate recollection of items of information which were "learned" at some point in the past.

Mnemonics is the art of improving or developing the memory, and incorporates a number of tools utilized by students for assuring that information not only is learned but remains learned. One tool of mnemonics is the use of flashcards, either prepared by the student or otherwise produced. A flashcard may have any shape, size, or material of construction, but generally is a relatively small, flat, two-sided piece of stiff paper. A 3×5 index card is one well-known format for a flashcard, and because it is blank it permits the student to select the information which is to be learned. The flashcard typically has a first or "cue" side on which a question or item of interest is written, printed, or the like, and a second or "response" side on which the answer is likewise placed. The student, through use of the flashcards, can test his or her memory with regard to the responses, to the questions on which the responses are based, or any other recognition system.

A particular advantage of student-created flashcards is that the student is called upon to distill or cull from a larger body of information particular information items of interest. Each student will generally select items of information uniquely of interest to him or her, so that flashcards created for one student may not be of much assistance to another. In addition, because the student is called upon to create the information for the cue and response sides, then the selection process itself forces the student to concentrate upon what he or she is doing and thereby reinforces the memory with regard to that information.

Yet a further advantage of flashcards is that their order may be altered, flashcards for different subject areas may be combined in order to prevent a rote memorization response, and they may be discarded or removed from the set once learned or no longer of primary relevance. Alternatively, flashcards may need to be reviewed only on some infrequent basis, so that they may be temporarily discarded for ultimate reuse.

Personal computers have made many changes in the educational environment, not the least of which is through educational games seeking to enhance or reinforce the learning capabilities of students. Educational games and like software, however, are not tailored to the individual student. Thus, the software will provide information about a particular subject to all students, but the information thus provided may not be of interest or assistance to a particular student. In addition, because the student will not have participated in selecting the information presented by the software, then there is no selection process providing for initial recognition by the student of the information. Also, while the software may assist the student in learning certain items of information in that subject matter, applicant is not aware of any educational software permitting the student or user to selectively review previously learned information and/or permitting selective review of the information in a sequence chosen by the student.

In can be seen from the above that there is a need for computer software which will permit a student to initially select the information which is to be subject to review, and which will thereafter permit the student to review that information in any sequence and format desired. The disclosed invention meets these needs and overcomes the noted disadvantages through use of computer software permitting the student to create simulated flashcards which may be thereafter combined, sorted, and reviewed when and how desired by the student.

SUMMARY OF THE INVENTION

The principal object of the disclosed invention is a method of displaying information in the form of simulated flashcards for learning purposes.

A method of displaying information for learning purposes according to the invention comprises the steps of providing within a computer an information set including at least a first information topic. The first information topic includes a plurality of discrete information elements. The discrete information elements are caused to be arranged for display within the computer in a sequence specified by the user. The discrete information elements are then displayed with a display operably associated with the computer in the specified sequence.

A method of using simulated flashcards, according to the invention, comprises the steps of inputting into a computer a plurality of information elements simulating a set of flashcards. Each simulated flashcard has a cue portion and a response portion. The simulated flashcards are segregated within the computer into a plurality of discrete topics. The information elements of each topic are related. At least some of the simulated flashcards are arranged within the computer based upon a preselected sequence. A preselected portion of the information elements of the simulated flashcards are then displayed with a display operably associated with the computer in the preselected sequence.

A method of learning based upon simulated flashcards, according to the invention, comprises the steps of entering into a computer a plurality of information elements simulating a set of related flashcards. The information elements of each simulated flashcard simulate a cue portion and a response portion. The simulated flashcards are segregated within the computer into a plurality of discrete topics. The information elements of the cue portion of each simulated flashcard are related based upon a user selected criteria. At least some of the simulated flashcards are arranged within the computer based upon a preselected sequence. A preselected portion of the information elements of the simulated flashcards are displayed to the user in the preselected sequence with a display operably associated with the computer. The user then indicates to the computer those flashcards which have been learned, and a notation is made within the computer of that event.

These and other objects and advantages of the invention will be readily apparent in view of the following description and drawings of the above-described invention.

DESCRIPTION OF THE DRAWINGS

The above and other objects and advantages and novel features of the present invention will become apparent from the following detailed description of the preferred embodiment of the invention illustrated in the accompanying drawings, wherein:

FIG. 3 is an elevational view of another computer screen when the simulated flashcards of the invention are being reviewed;

FIG. 4 is another elevational view of a computer screen when the simulated flashcards of the invention are being reviewed in another configuration;

FIG. 5 is a flow chart of the high level commands of the invention;

FIG. 16 is an elevational view of a portion of a computer screen according to the invention;

FIG. 17 is a portion of another computer screen according to the invention;

FIG. 18 is a portion of another computer screen according to the invention;

DETAILED DESCRIPTION OF THE INVENTION

Figure 1:
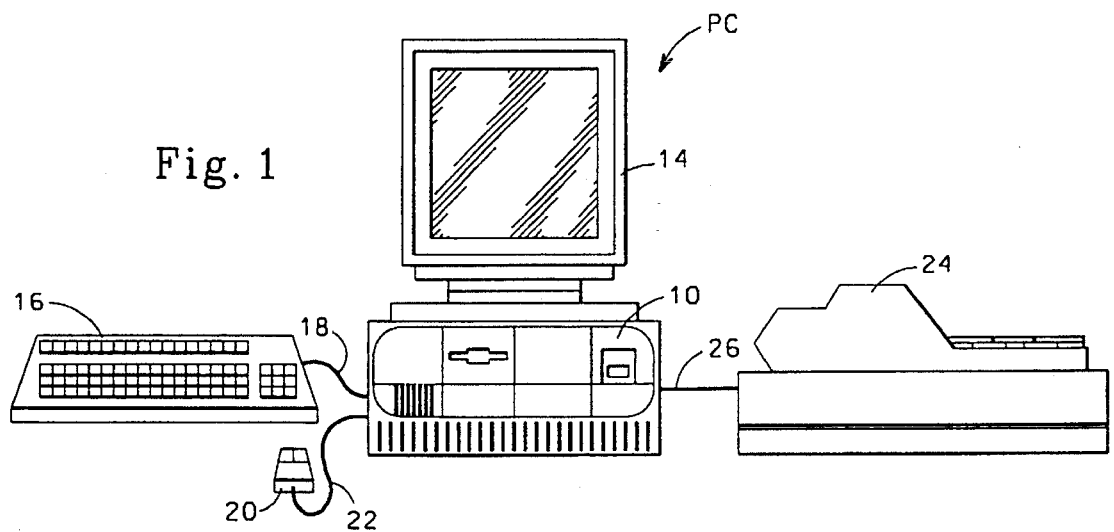
FIG. 1 if a schematic view of a computer system according to the invention.

Personal computer system PC, as best shown in FIG. 1, includes a personal computer 10, an operably associated CRT display or monitor 14, and an operably associated keyboard 16. Keyboard 16 may be integral with computer 10, or may be connected thereto through cord 18. Keyboard 16 preferably has a "mouse" integral therewith for use in implementing the invention. Alternatively, a mouse 20 may be provided, and which is connected to computer 10 by cord 22. Personal computer 10 preferably has an enhanced graphics interface, such as through use of the Macintosh® operating system or the Windows system.

Printer 24 may be connected to personal computer 10 through cable 26 in order to permit the simulated flashcards of the invention to be printed into actual flashcards for use when the computer system PC is not available. Alternatively, the simulated flashcards may be printed in paragraph format in order to create study notes, or the like.

We prefer that the simulated flashcards according to the invention be created by the user, because selection of the information by the user enhances the learning experience. Because the user is called upon to create the items of information forming the simulated flashcards, then that initial selection process helps the user to begin to recall or "learn" the information which is to be studied during use of the invention. Because it is the user who is creating the simulated flashcards which ultimately will be learned, then the invention has two principal modes of use. In the first or "edit" mode, the user selects the items of information which the simulated flashcards are to contain, and then enters that information into the computer 10 through keyboard 16. Alternatively, the items of information may be input through some other source, such as through input of premade simulated flashcards. In the second or "review" mode, the user reviews or learns the previously entered information, with the information being displayed in a sequence and format which the user selects.

Flashcards are usually created in "sets", with each set containing no particular number of flashcards. Within that set, however, there may be a number of topics or subsets which are more particularized based upon a user selected criteria with regard to the items of information and which therefore cause the flashcards of a set to be segregated. Thus, a set of flashcards on the general topic "MONKEY" may also have a number of topics within that set. One topic, for example, could be "The Ape Family", with other topics being "The Chimpanzee Family", "What Monkeys Eat", or any other subcategory of information which a user may desire. Because the user creates the flashcards, then the user may also select the criteria upon which each topic is to be based.

The disclosed invention is able to support 255 topics per set, with each set containing as many as 4,500 simulated flashcards. In addition, as many as thirteen sets may be open at any time, thereby permitting the user flexibility not only as to the information which is being reviewed, but also in shifting flashcards between topics and sets as desired.

Figure 2:
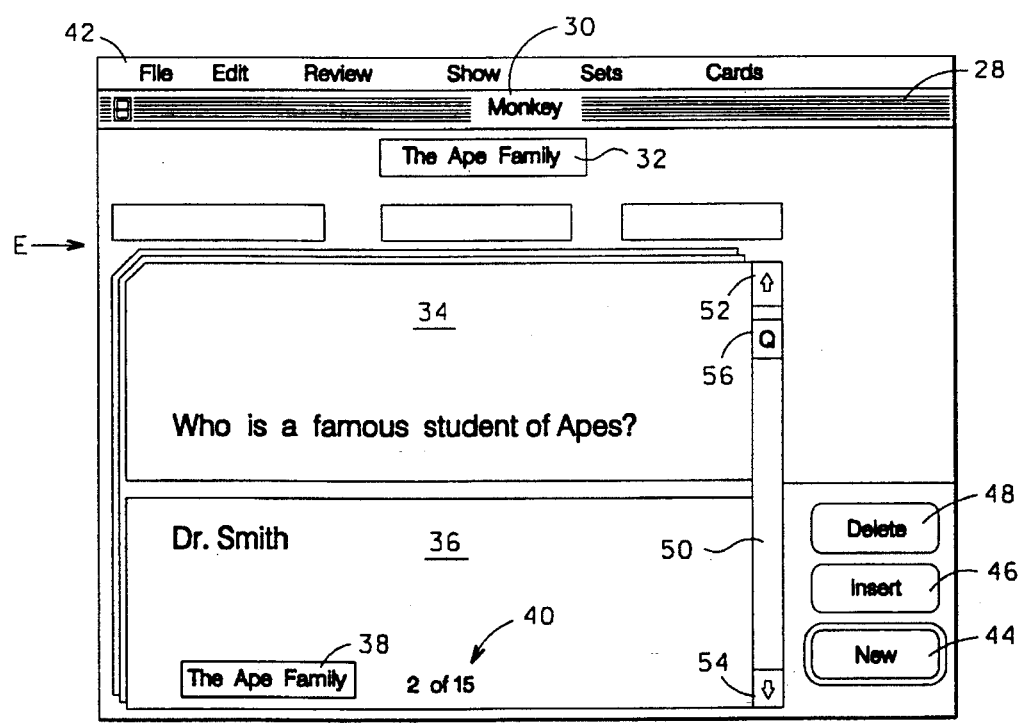
FIG. 2 is an elevational view of a portion of a screen displayed to the user when simulated flashcards according to the invention are being created.

FIG. 2 discloses a computer screen displayed on monitor 14 when the invention is in the edit or flashcard creating mode. Title bar 28 has a box 30 which displays to the user the "set" of the is open window. Box 32 displays to the user the topic or subset which is then being edited. Cue portion 34 represents one "side" of a flashcard, with response portion 36 representing the opposite "side" of that flashcard. Response portion 36 has a box 38 which identifies the topic to which the response applies, with the topic box 38 corresponding to the topic box 32. Response side 36 also has an area 40 which indicates to the user the entry number or order of that flashcard within the total number of flashcards in that topic. The user enters the information onto cue portion 34 through keyboard 16. After the selected items of information have been entered onto the cue portion 34, then the user by pressing the "Tab" key of keyboard 16 automatically shifts to the response portion 36 which likewise then has its items of information entered through keyboard 16. In this process, the user may create or modify the simulated flashcards within a given topic or set.

Figure 19:
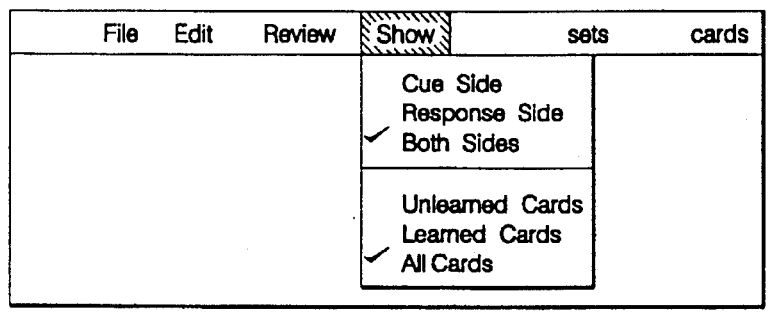
FIG. 19 is a portion of another computer screen according to the invention.
Figure 20:
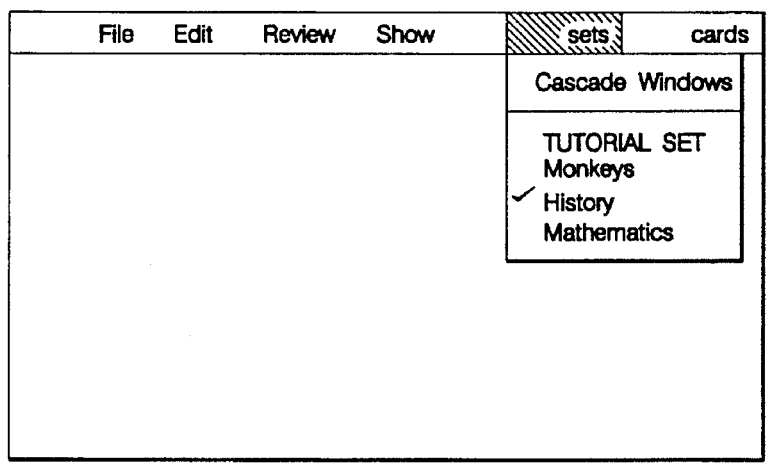
FIG. 20 is a portion of another computer screen according to the invention.

Menu bar 42 extends across the upper portion of the screen of FIG. 2, with the menu bar 42 containing notations about computer menu screens which the user may access when operating the program of the invention or when making changes to the way in which the program is being operated. The "File" screen is illustrate at FIG. 16, the "Edit" screen illustrated at FIG. 17, and the "Review" screen at FIG. 18. The "Show" screen is illustrated in FIG. 19, the "Sets" screen in FIG. 20, and the "Cards" screen illustrated in FIG. 21. Each of those screens of FIGS. 16–21 may be accessed by the user through aligning the cursor thereon and clicking the mouse on the appropriate portion of menu bar 42.

Figure 21:
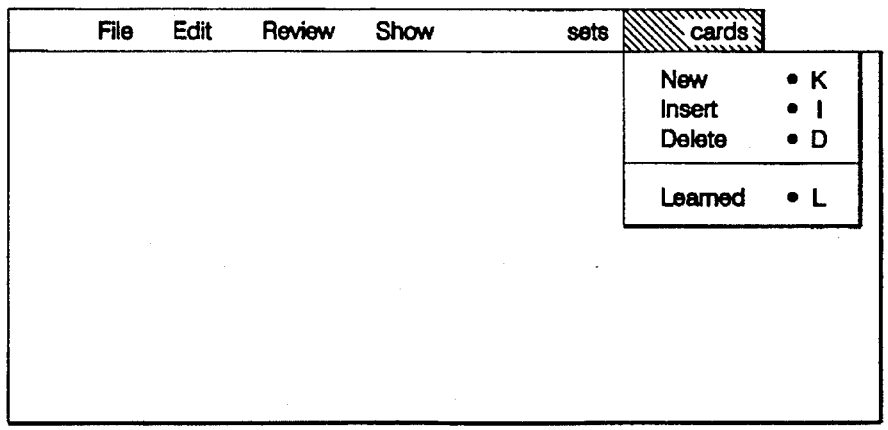
FIG. 21 is yet a further portion of another computer screen according to the invention.

The mouse 20 may also be used by the user for causing new cards to be created, existing cards to be inserted or changed in their position within a topic or set, or cards to be deleted. Simulated button 44 of the screen E of FIG. 2 may be clicked on by the user in order to create a new card, or the user may click on the "Cards" portion of menu bar 42 so that the screen of FIG. 21 is opened and a new card may be created via that route. Similarly, button 46 may be clicked on in order to cause a card to be inserted in a topic or set, with button 48 being clicked upon to cause a card to be deleted. As with button 44, buttons 46 and 48 may be bypassed through resort to screen 21.

Scroll bar 50 has scroll arrows 52 and 54 which the user may click upon through the mouse 20 in order to move through a topic or set. Alternatively, the user may click upon thumb 56, and then drag through scroll bar 50 in order to page through the topic or set. As those skilled in the art appreciate, clicking on scroll arrows 52 and 54 will cause the system to move through the topic or set at a predetermined rate, while dragging thumb 52 will cause the system to move through the topic or set in an amount proportional to movement of thumb 52 along scroll bar 50.

FIG. 3 illustrates a computer screen R1 displayed to the user when the invention is in the "review" mode. As with the screen E of FIG. 2, menu bar 42 is provided in order to permit the screens of FIGS. 16–21 to be accessed. Title bar 28 displays within title box 30 the set which is being reviewed, with topic box 32 displaying the topic or subset within that set which is being reviewed. It can be noted in FIG. 3 that topic box 32 indicates that the user is reviewing "All Topics" within the set "MONKEY", with box 72 indicating that the card 70 being reviewed is from the topic "The Ape Family".

FIG. 3 also illustrates set box 58 which has a portion 60 indicating to the user how many cards are in the set being reviewed. Box 62 has a portion 64 which indicates to the user the number of cards in that set which are "unlearned", while box 66 has a portion 68 indicating how many cards in that set have been "learned". Thus, FIG. 3 indicates to the user that there are 23 cards within the set being reviewed, with one of those cards having been learned and 22 cards remaining to be learned. It is the user who designates cards as "learned" or "unlearned" and portions 64 and 68 are updated based upon user input as review proceeds.

Cue portion 70 is displayed on the screen of FIG. 3, and contains the items of information which had been entered by the user on the cue portion 34 of FIG. 2. Cue side 70 has a box 72 which identifies to the user the topic to which that particular card pertains. Area 74 indicates to the user the numerical sequence of that card within the total number of cards to be reviewed as displayed at 60. As with FIG. 2, scroll bar 76 is provided, and has scroll arrow 78 and 80 and thumb 82 permitting the user to move through the cards to be reviewed as desired by the user.

FIG. 3 also discloses pie chart 84 which provides a graphic approximation to the user of the percentage of cards which have been "unlearned". Thus, as each card which previously had been marked learned is reviewed and the user determines that it is now "unlearned", then the pie chart contracts until all cards have been reviewed. By clicking on portion 68, the user shifts the system into a mode permitting previously learned cards to be reviewed, thereby permitting the user to make certain that the information continues to be known. The "learned" legend of box 66 is highlighted when "learned" cards are being reviewed.

Should the user desire to review either a previous flashcard or the side preceding that which was being displayed, then clicking on button 86 causes that to occur. Should the user wish to review either the next flashcard or the next side in sequence, then that is accomplished by clicking on button 88. Clicking on button 90, on the other hand, indicates that the then current card being displayed has been "unlearned", thereby causing portions 64 and 68 and pie chart 84 to be updated. In addition, clicking on button 90, causes the current card being displayed to be marked now as "unlearned".

FIG. 4 illustrates computer screen R2 displayed on monitor 14 when the user elects to review the cards in groups of predetermined number, and when unlearned cards are to be reviewed. Box 92 has portion 94 which indicates how many cards are to be reviewed as a "group". Box 96, on the other hand, indicates to the user the numercial sequence of the group then being reviewed within the total number of groups available for review. Thus, for example, should portion 94 indicate by a user input that 23 cards are to be reviewed in each group, then box 96 would indicate to the user the total number of groups available for review and the number of the current group within the overall grouping. Group capability permits the user to review cards in finite numbers which the user selects.

It can be noted on screen R2 that the "unlearned" legend has been highlighted and that button 90 now displays the notation "learn". This occurs when the cursor is aligned on portion 64 and the mouse clicked, so that cards which are "unlearned" may now be reviewed by the user to determine whether the items of information have been learned. Thus the user may review cue side 70, and by clicking on next button 88 have the response side 36 displayed. If the items of information or answer are known or "learned", then learn button 90 may be clicked upon. This will cause portions 64 and 68 and pie chart 84 to be updated. Should the answer not be known, then clicking on button 88 will cause the next in sequence cue side 34 to be displayed as the current card, with the previous card continuing to be marked as "unlearned".

Upon the program being launched at 98 as best shown in FIG. 5, then at 100 the determination is made whether the launch was by file selection. If yes, then the file is loaded into memory at 102, with the variables being initialized at 104. A new window is created at 106, with the contents of the file being displayed on monitor 14 and the new window being brought to the front for display to the user. Should the launch not have been by file selection, then a user input at 108 is considered.

FIGS. 16–21 illustrate menu screens which may be opened and clicked on to provide various inputs which the user may make after clicking upon the appropriate portions of menu bar 42. For example, should the user have clicked upon the "File" portion of menu bar 42 and thereby opened the screen of FIG. 16, then the determination is made at 110 whether the user input has requested through clicking on the "open" box that an existing file be opened. In that event, the file is loaded into memory at 102, as previously explained. Should the user have instead requested that a new file be created, then that determination is made at 112. A new file is then created at 114, the variables are initialized at 116, and the edit mode is implemented. Thus, the user, by opening the "file" menu of FIG. 16, may cause an existing file to be opened, a new file to be created, a file to be closed, the pages set up, cards to be printed, the file to be exported for use elsewhere, or the program to be quit.

At 118 it is determined whether any windows are open. If yes, then the determination is made at 120 whether the user input at 108 had been for a window to be closed. If yes, the file is closed at 122. Alternatively, the user input at 108 may have been a request for another window to become the active window being reviewed or edited, and that determination is made at 124. If the answer at 124 is yes, then that window is brought to the front and becomes the active window at 126.

Should the user have clicked upon the "Review" portion of menu bar 42, then the menu of FIG. 18 would have been opened. Thus, at 128 the system determines whether the user input at 108 had been a request that the mode be changed between "review" and "edit" as may be accomplished through the screen of FIG. 18. If the decision at 128 is yes, then at 130 the mode is reset so that the front window is set into review if it had been in edit, or is set into edit if it had been in review. The user may have clicked upon the "edit" portion of menu bar 42, on the other hand, and thereby drawn down the menu of FIG. 17. That determination is made at 132, and at 134 the edit commands of FIG. 17 are caused to be implemented. The edit commands permit the user to make various changes to the items of information on each cue portion 34 and response portion 36, to copy cards from one set to another, and to move them.

Should the user have clicked upon the "review" portion of menu bar 42, then the review menu of FIG. 18 will be drawn down or opened. That determination is made at 136, and the review commands of FIG. 18 are implemented at 138 pursuant to FIG. 6.

Should the user input at 108 have been that the "print" command of the "file" menu of FIG. 16 had been accessed or clicked upon, then that determination is made at 140 and the items of information printed at 142.

Should the user input at 108 have been that the "preferences" portion of the "edit" menu of FIG. 17 had been clicked upon, then that determination is made at 144 and the preferences commands implemented at 146. The preferences commands permit the user to select the type size, type style, centering and other presentation features of each cue portion 34 and response portion 36.

Finally, should the user input at 108 be that the "quit" portion of the "file" menu of FIG. 16 had been implemented, then the determination is made at 148. If yes, then each open window is closed at 150, and the program terminated at 152.

Figure 6:
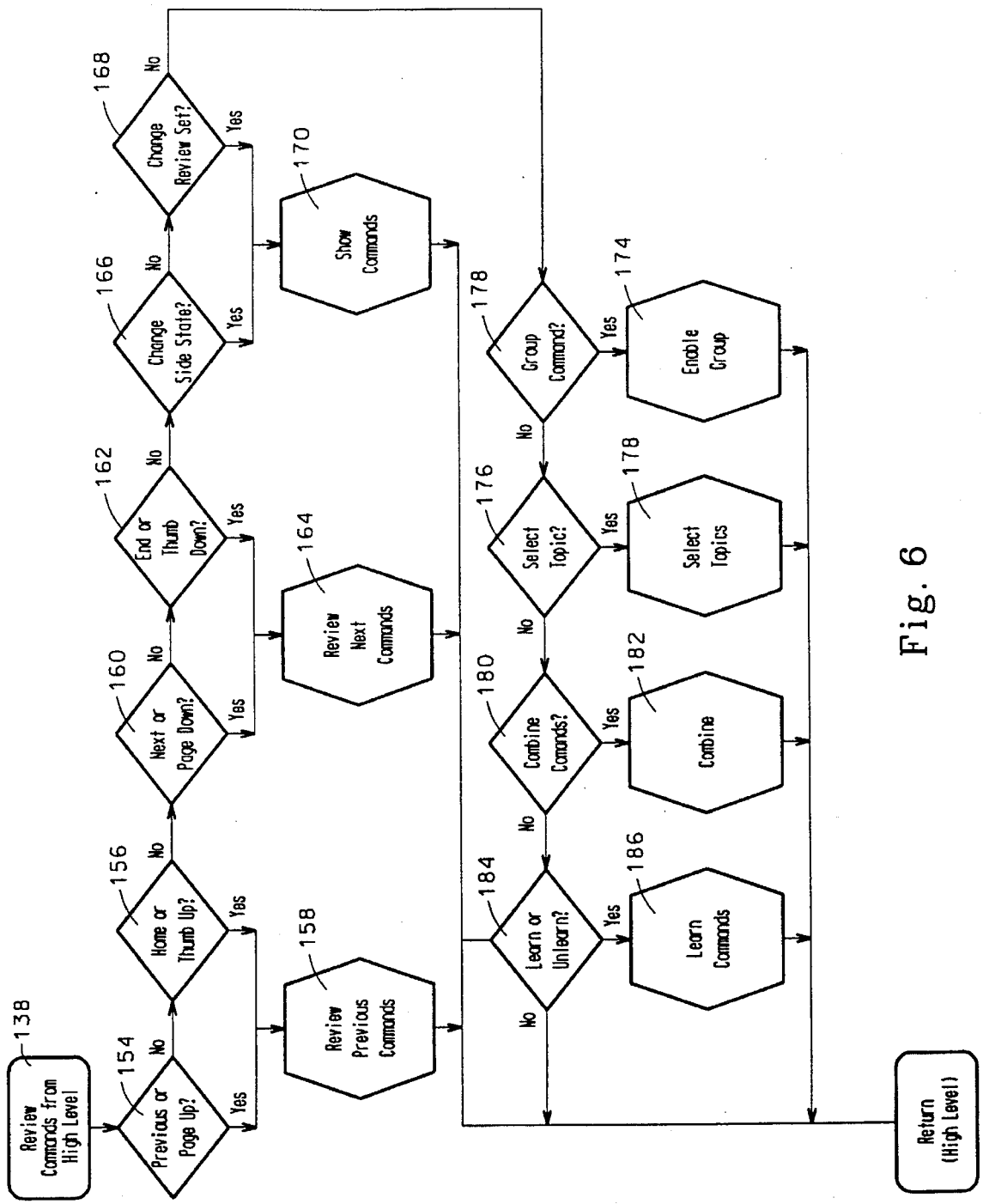
FIG. 6 is a flow chart expanding upon a portion of the flow chart of FIG. 5.

FIG. 6 illustrates a portion of the methodology implemented by the invention when in the "review" mode of operation. The review mode, as previously explained, is that mode implemented when the user desires to review the items of information which previously had been entered into computer 10 through keyboard 16 in creating the cue portion 34 and response portion 36 of each simulated flashcard of the invention. Thus, in the review mode, the user continues the process of learning the information which originally had been selected from the mass of information presented.

Figure 7:
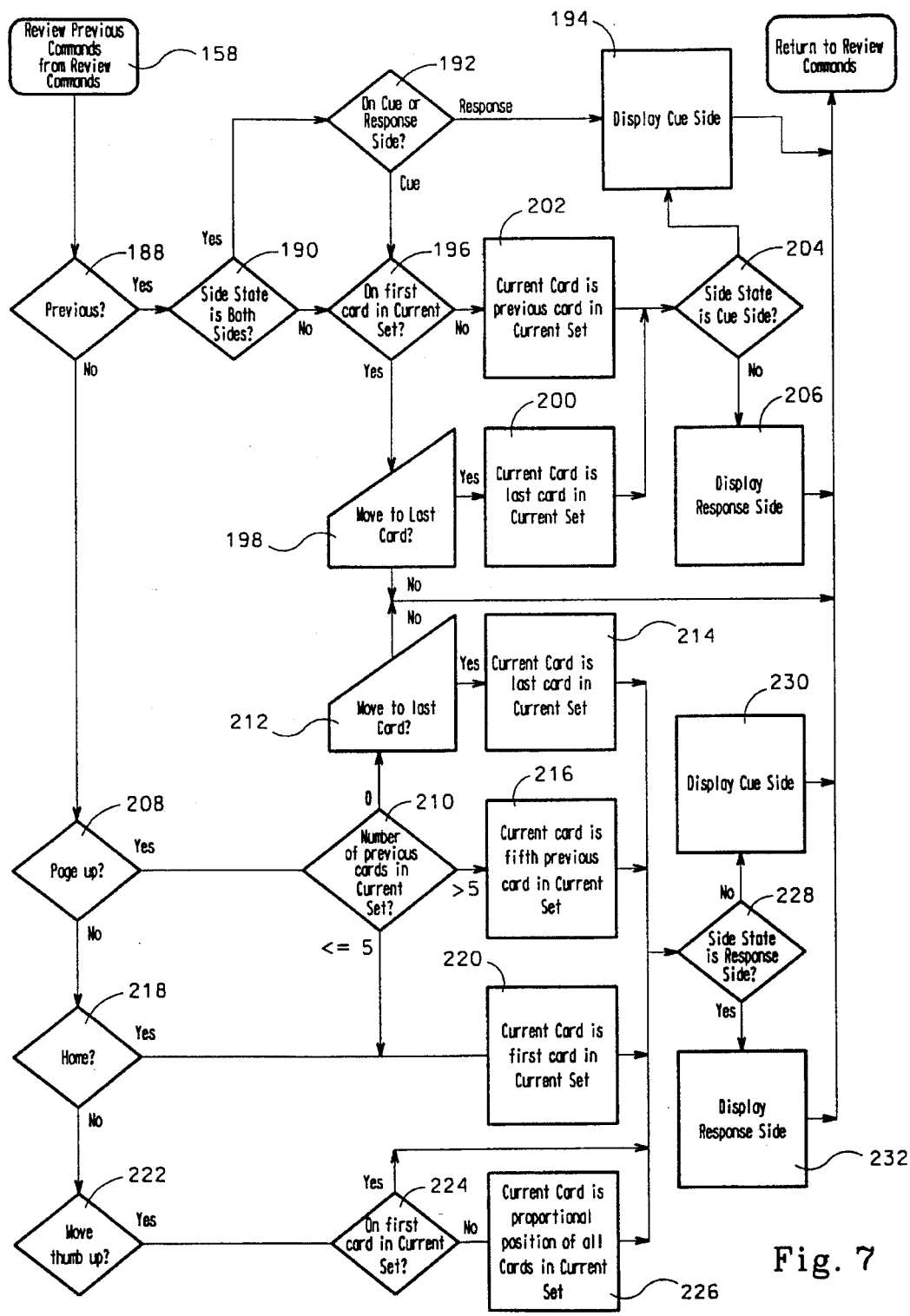
FIG. 7 is a flow chart expanding upon a portion of the flow chart of FIG. 6.

Should it be determined at 136 that the user input had been to request review of previously entered cards, then FIG. 6 is implemented in order to determine what input the user had made with regard to the screens of FIGS. 3 or 4. At 154, it is determined whether the user had clicked upon the "previous" button 86 or pressed the "page up" key on keyboard 16. At 156, on the other hand, the system determines whether the user pressed the "home" key of the keyboard 16, or clicked upon the "thumb up" scroll arrow 78. If the determination at either 154 or 156 is that the user had made that input, then the system proceeds to 158 and the flow chart of FIG. 7 because the user input indicates a desire to review either the immediately previous card or the immediately previous portion, whether cue portion 34 or response portion 36, of the current card being displayed. At 160, on the other hand, the system determines whether the user has clicked upon the "next" radio button 88, or has pressed the "page down" of keyboard 16. At 162, on the other hand, it is determined whether the user has pressed the "end" key of keyboard 16, or has clicked on "thumb down" scroll arrow 80. If either 160 or 162 is yes, then the system proceeds to 164 as implemented by the flow chard of FIG. 8 in order to permit the user to review the immediately next card or the immediately next portion of the current card.

At 166 the determination is made whether the user input at 108 had been that the "side", cue portion 34 or response portion 36, to be displayed was to be changed, such as by clicking on the "show" portion of menu bar 42 and then scrolling the cursor down to and clicking upon cue side, response side, or both sides. By opening the show menu, the user may elect to display only the cue side, only the response side, or both sides. The user may change the side to be displayed at any time during the process of reviewing the cards. At 168, on the other hand, the decision is made whether the user had opened the "sets" menu of FIG. 20 in order to change the set which was to be reviewed. As many as thirteen sets may be opened at any time, although review may occur with only one set at a time. Thus, by opening the sets menu of FIG. 20, then the user may elect the exemplary history or mathematics sets for review, rather than the "MONKEY" set of FIGS. 3 and 4. If either 166 or 168 is yes, then the system proceeds to 170 in order to implement the flow chart of FIG. 9.

Figure 10:
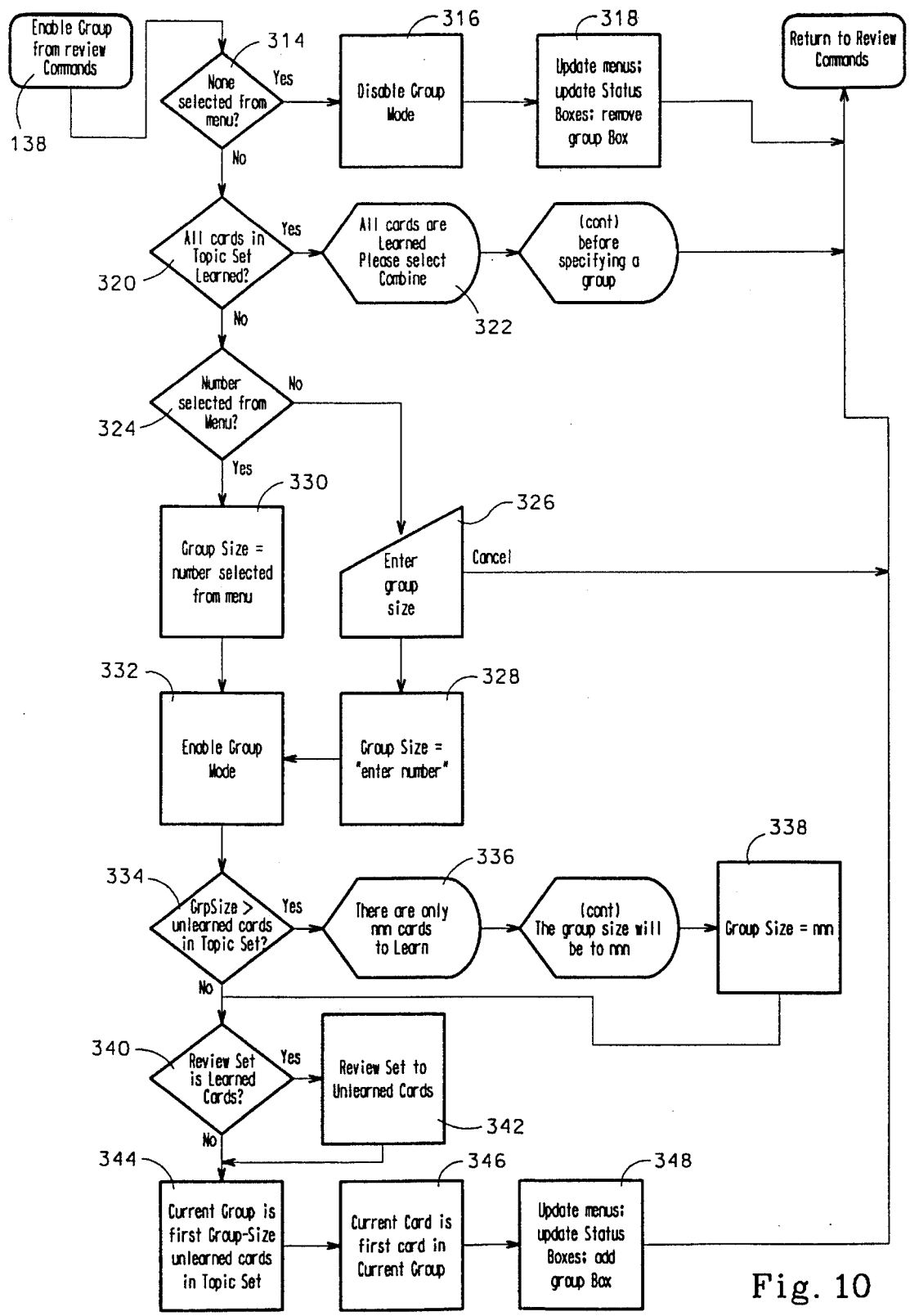
FIG. 10 is a flow chart expanding upon a portion of the flow chart of FIG. 6.

The determination is made at 172 whether the user input had been to open the review menu of FIG. 18 in order to implement the "groups" feature illustrated with regard to screen R2 of FIG. 4. If yes, then the system proceeds to 174 in order to implement the flow chart of FIG. 10.

The determination is made at 176 about whether the user input has been to click on topic box 32 in order to permit another topic to be selected for review. FIGS. 3 and 4 illustrate through box 32 that the user is reviewing "all topics". Aligning the cursor with and clicking on box 32 opens the topic menu. The user may then scroll through the topics in order to elect to review only a certain topic or selected topics. Thus, if the answer at 176 if yes, at 178 the system implements the flow chart of FIG. 11.

The determination is made at 180 whether the user has opened the "review" menu of FIG. 18 in order to elect the "combine" option. This option permits the user to designate all cards in a topic or set as either learned or unlearned. If the combine option of FIG. 18 has been implemented as determined at 180, then the system proceeds at 182 to implement the flow chart of FIG. 13.

The determination is made at 184 whether the user input had been to click upon portions 64 or 68 in order to request that the cards to be reviewed be those which were marked learned or unlearned. The user may elect the category of cards which are to be reviewed. Thus, if the answer to 184 is that the user input was to request a change in the category of cards being reviewed, then the system proceeds at 186 to implement the flow charts of FIGS. 14 and 15.

If it is determined at 154 or 156 that the user has requested a review of some previous item of information, then the determination is made at 188 whether the "previous" button 86 of FIGS. 3 and 4 had been clicked upon. If yes, then the determination is made at 190 whether the "show" menu of FIG. 19 has been set for both sides of the simulated flashcard to be sequentially displayed. If the answer at 190 is yes, then the determination is made at 192 whether the card being displayed, the current card, is on the cue side 34 or the response side 36. If the current card is on the response side 36 as determined at 192, then at 194 the cue side 34 is set for display and becomes the current card.

Should the determination at 192, on the other hand, be that the current card is on the cue side 34, then the determination is made at 196 whether the current card is the first card in the current set. If the answer at 196 is yes, then a message is displayed at 198 asking the user whether he or she wishes to move to the last card in the current set. If the user input to the message of 198 is yes, then at 200 the system proceeds to the last card in the current set which then becomes the new current card.

If the answer to 196 is no, then at 202 the system notes that the new current card is a previous card from the current set. The determination is made at 204 whether the show menu of FIG. 19 is set for cue side only. If the answer to 204 is no, then the response side is caused to be displayed at 206. If yes, then cue side 34 is caused to be displayed at 194.

Should the user input at 108 not have been clicking on the previous button 86, then at 208 the system determines whether the user input had been to press the "page up" key of keyboard 16. At 210 the inquiry is made into how many previous cards are in the current set. If the answer is zero, then at 212 a message is displayed to the user on monitor 14 asking whether he or she wishes to move to the last card in the current set. If the user input in response to that message is yes, then at 214 the new current card is set as the last card in the current set. Pressing the page up key causes the system to jump or move one card at a time, thereby necessitating the inquiry at 210. Should the answer at 210 be that there are more than five previous cards in the current set, then at 216 the new current card is the fifth card previous to the last current card in the current set. Should the answer at 21.0 be that there are fewer than or no more than five cards in the current set or should the decision be reached at 218 that the user input at 108 had been that the "home" key of keyboard 16 had been pressed, then the current card is set as the first card in the current set at 220.

Should it be determined at 222 that the user has clicked upon the thumb up scroll button 78, then the inquiry is made at 224 whether the current card is the first card in the current set. If the answer at 224 is no, then the system moves through the set or topic, as appropriate, until it reaches that card which corresponds in proportion to the distance the user moved the thumb 78 along the scroll bar 76.

At 228 the determination is made whether the show menu of FIG. 19 is set for response side only. If the answer at 228 is no, then the cue side is caused to be displayed at 230. If the answer at 228 is yes, on the other hand, then the response side 36 is caused to be displayed at 232.

Figure 8:
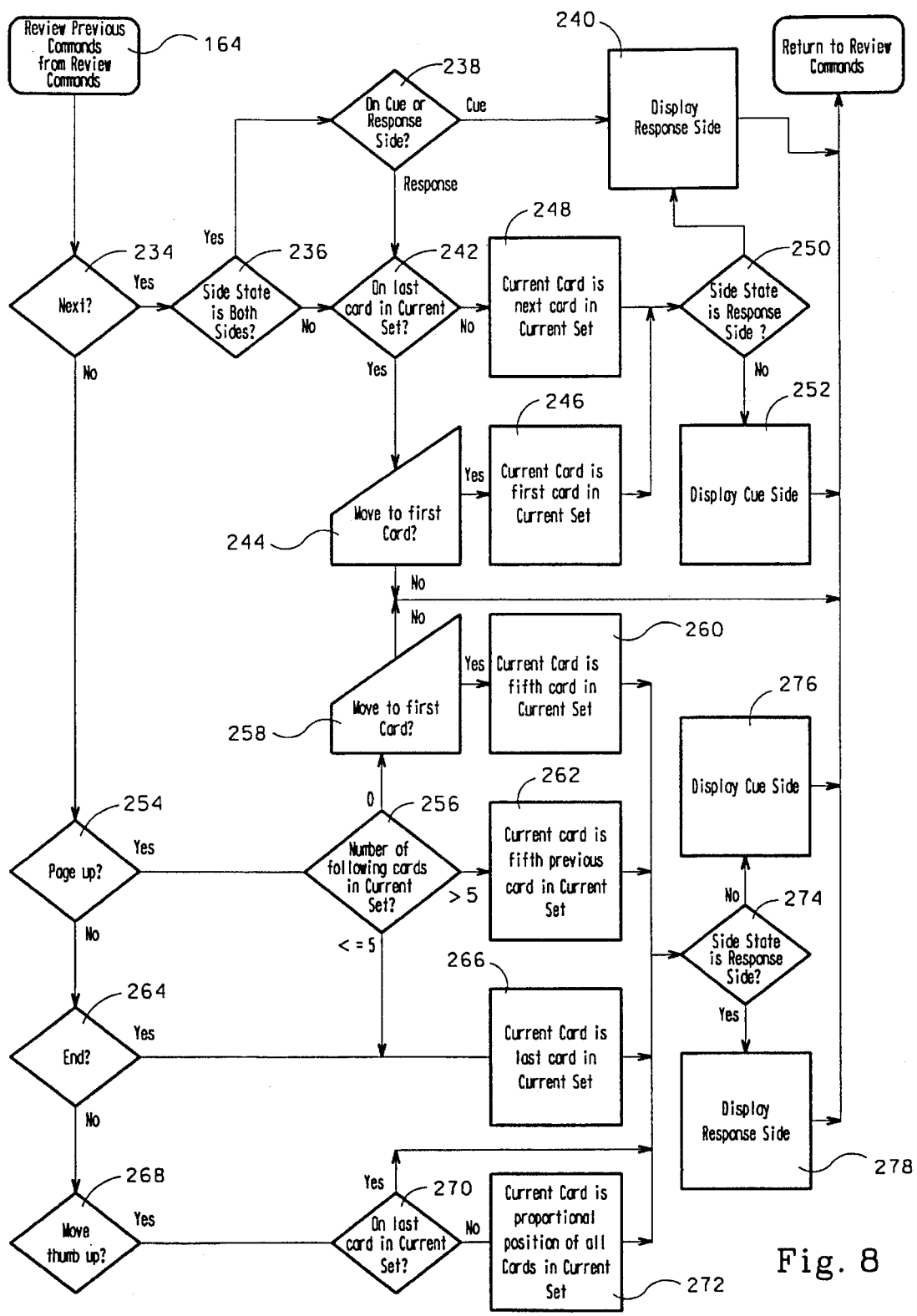
FIG. 8 is a flow chart expanding upon a portion of the flow chart of FIG. 6.

Should the answer to 160 or 162 have been yes, then at 164 the system proceeds to FIG. 8 in order to permit review of the next or subsequent cards or sides in the set or topic. At 234 the determination is made whether the user has clicked upon the next button 88. If yes, then at 236 the determination is made whether the show menu of FIG. 19 is set for both sides. If yes, then at 238 the inquiry is made whether the current card is on its cue side 34 or response side 36. If it is determined at 238 that the current card, the card then being displayed, is on its cue side, then at 240 the card is "flipped" in order to cause its response side to be displayed at 240.

If the answer to 238 is that the current card is on its response side, then the inquiry is made at 242 whether the current card is the last card in the current set. If the answer to 242 is yes, then at 244 a message is displayed on monitor 14 to the user inquiring whether he or she wishes to move to the first card in the set. If the user input in response to 244 is yes, then the current card is set as the first card in the current set at 246. If the answer to 242, on the other hand, is no, then the current card is set to be the next card in the current set at 248. At 250 the determination is made whether the show menu of FIG. 19 is set for response side only. If the answer to 250 is yes, then the response side of the next card, which is the new current card, is caused to be displayed at 240. If the answer to 250, on the other hand, is no, then the cue side 34 of the next card, which is the new current card, is displayed at 252.

At 254 the determination is made whether the user has pressed the page down button of keyboard 16. The page down button causes the system to move one card at a time, much like pressing the page up button as at 208. At 256 the inquiry is made into how many following or next cards are in the current set. If the answer to 256 is that there are no next or following cards, then at 258 a message is caused to be displayed to the user inquiring whether he or she wishes to move to the first card in the set. If the user input to the message of 258 is yes, then the current card is set to be the first card in the set at 260. If the answer to 256 is that there are more than five following cards in the current set, then the new current card is set to be the fifth card following the then current card in the current set at 262. If the answer to 256 is that there are five or fewer following cards in the current set or if it is determined at 264 that the user has pressed the end button of keyboard 16, then the current card is set as the last card in the current set at 266.

The determination is made at 268 whether the user has clicked on the thumb down scroll button 80 of FIGS. 3 and 4. The inquiry is made at 270 whether the current card is the last card in the current set. If no, then the current card is set to be that card which corresponds in proportion to the distance the user moved the thumb 78 down the scroll button bar 76.

At 274 determination is made whether the show menu of FIG. 19 is set for response side only. If no, then the cue side 34 of the new current card is caused to be displayed at 276.

If the answer to 274 is yes, on the other hand, then the response side 36 of the new current card is caused to be displayed at 278.

Figure 9:
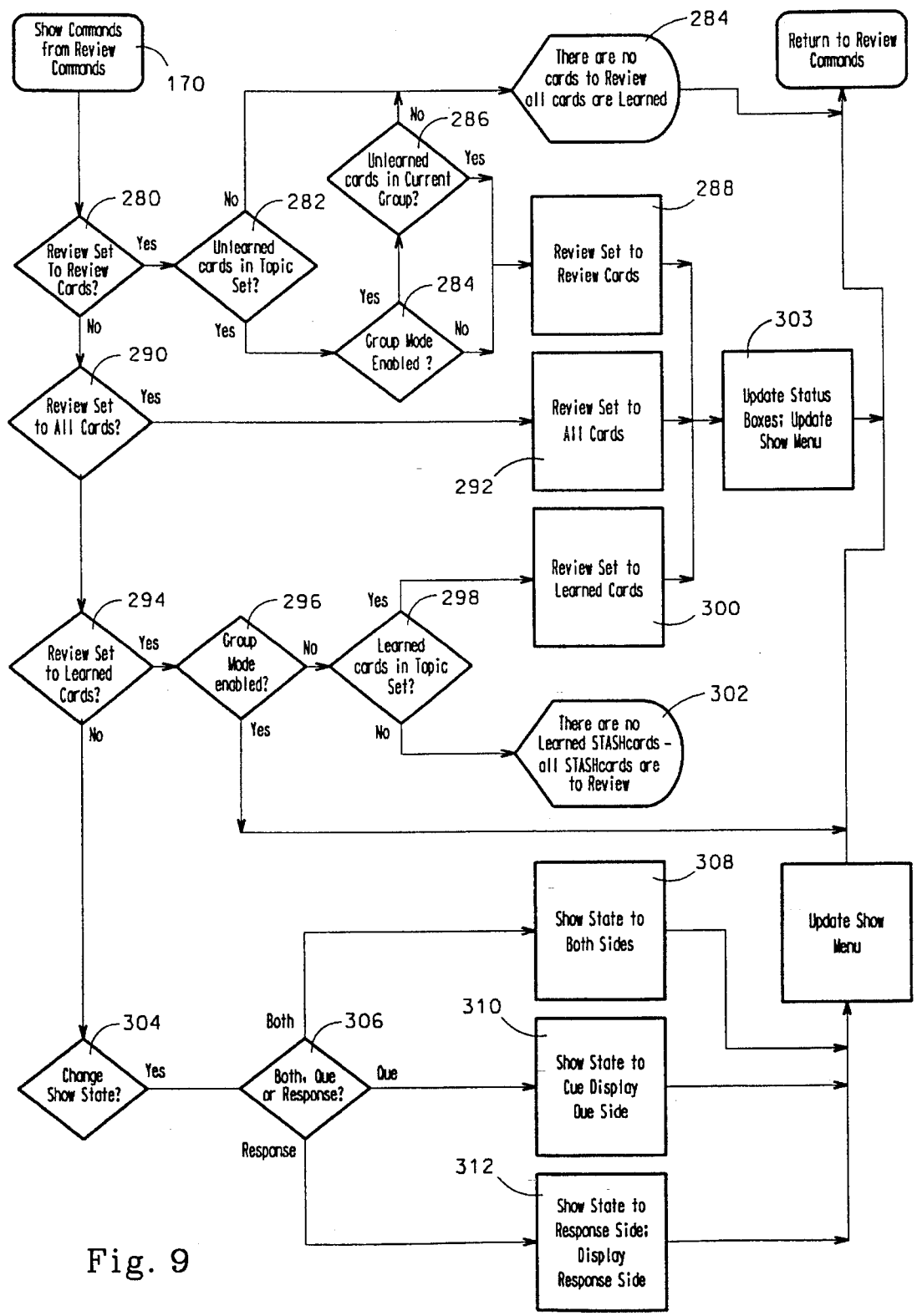
FIG. 9 is a flow chart expanding upon a portion of the flow chart of FIG. 6.

Should the answer to either 166 or 168 of FIG. 6 be yes, then at 170 the system proceeds to the flow chart of FIG. 9 in order to implement the requested display of the cards. At 280 the determination is made whether the review menu of FIG. 18 is set for review. The first box of the review menu will contain the notations either "review" or "edit", depending upon the mode which the system is in. If the answer to 280 is yes, then the inquiry is made at 282 whether the topic set contains cards which have not yet been learned. If the answer to 282 is that there are no unlearned cards in the topic set, then at 284 a message is caused to be displayed on monitor 14 to the user that all cards in the set have been learned, and that there are no other cards to review. If the answer to 282 is yes, on the other hand, then at 284 inquiry is made whether the user has elected the "group" feature as may be implemented through the review menu of FIG. 18. If the answer to 284 is that the group mode is enabled, then the inquiry at 286 is made whether the current group contains cards which have not yet been learned. If the answer to 286 is no, then the message of 284 is caused to be displayed. Should the answer to 286 be yes, or should the answer to 284 be no, then at 288 the system is set for the review mode because they are still unlearned cards which are to be reviewed.

The determination is made at 290 whether the show menu of FIG. 19 is set for all cards. If yes, then all cards are indicated as being available for review at 292. At 294 the determination is made whether only learned cards are to be reviewed as is implemented by clicking on portion 68 and causing button 90 to be set to "unlearn". If the answer to 294 is yes, then at 296 the determination is made whether the group mode has been enabled through the review menu of FIG. 18. If group mode is not enabled as determined at 296, then the inquiry is made at 298 whether there are learned cards in the topic set. If yes, then that is indicated at 300. If there are no learned cards in the topic set, then a message is caused to be displayed at 302 to the user through the monitor 14 that there are no learned cards in the topic set and that all cards are for review. The status boxes are then updated at 303.

The determination is made at 304 whether the show menu of FIG. 19 has been accessed in order to cause the display state to be changed. At 306 inquiry is made whether the user has requested display of the cue side only, response side 36 only, or both sides. If the answer to 306 is both sides, then at 308 the system implements display of both sides of the cards. If the answer to 306 is cue side 34 only, then at 310 the system is set for display of the cue side 34 of the cards only. Finally, at 312 the system is set for display of the response side 36 only of the cards.

Should it be determined at 172 that the user input at 108 had been to elect the group mode as may be implemented through the review menu of FIG. 18, then at 314 the inquiry is made whether the user has selected any of the group sizes which are displayed on a submenu displayed when the group command is clicked upon. If it is determined at 314 that the user has failed to elect any of the group sizes from the submenu of FIG. 18, then at 316 the group mode is disabled because the default is for a zero group size. At 318 the group box 92 is eliminated, as is the group box 96 of FIG. 4.

The inquiry is made at 320 whether all cards in the topic set have been learned. If the answer to 320 is yes, then a message is displayed on monitor 14 to the user at 322 that all cards have been learned and that the user must select the combine option of the review menu of FIG. 18 before specifying a group. This is because there will be no cards in the topic set available for review, because all have already been learned. Thus, implementing "combine" will permit the user input to change the state of the cards from learned to unlearned.

Should it be determined at 320 that there are unlearned cards in the topic set, then the inquiry is made at 324 whether the user has selected from the group submenu one of the preselected group sizes. If the answer to 324 is no, then a message is displayed to the user on monitor 14 at 326 requesting entry through keyboard 16 of the number of cards to be in each group. Once the user enters a number through keyboard 16 for the group size, then at 328 the system indicates on monitor 14 that the group size is to be the number selected by the user. On the other hand, should the user select as the group size one of the preset numbers from the group submenu, then at 330 the group size is set as the menu number. At 332 the group mode is now enabled.

Inquiry is made at 334 whether the group size selected, whether through keyboard entry or from the submenu, exceeds the number of unlearned cards in the topic set. If yes, then a message is displayed on the monitor 14 to the user at 336 advising that the group size will be set to the number of unlearned cards in the topic set, and that change is implemented at 338.

The determination is made at 340 whether the review set is of learned cards. If yes, then at 342 the review is set to the unlearned mode of FIG. 3. At 344 the current group is chosen from the first cards in the topic set equaling the group size. At 346 the current card is set as the first card in the current group, and the status boxes 92 and 96 are updated at 348.

Figure 11A:
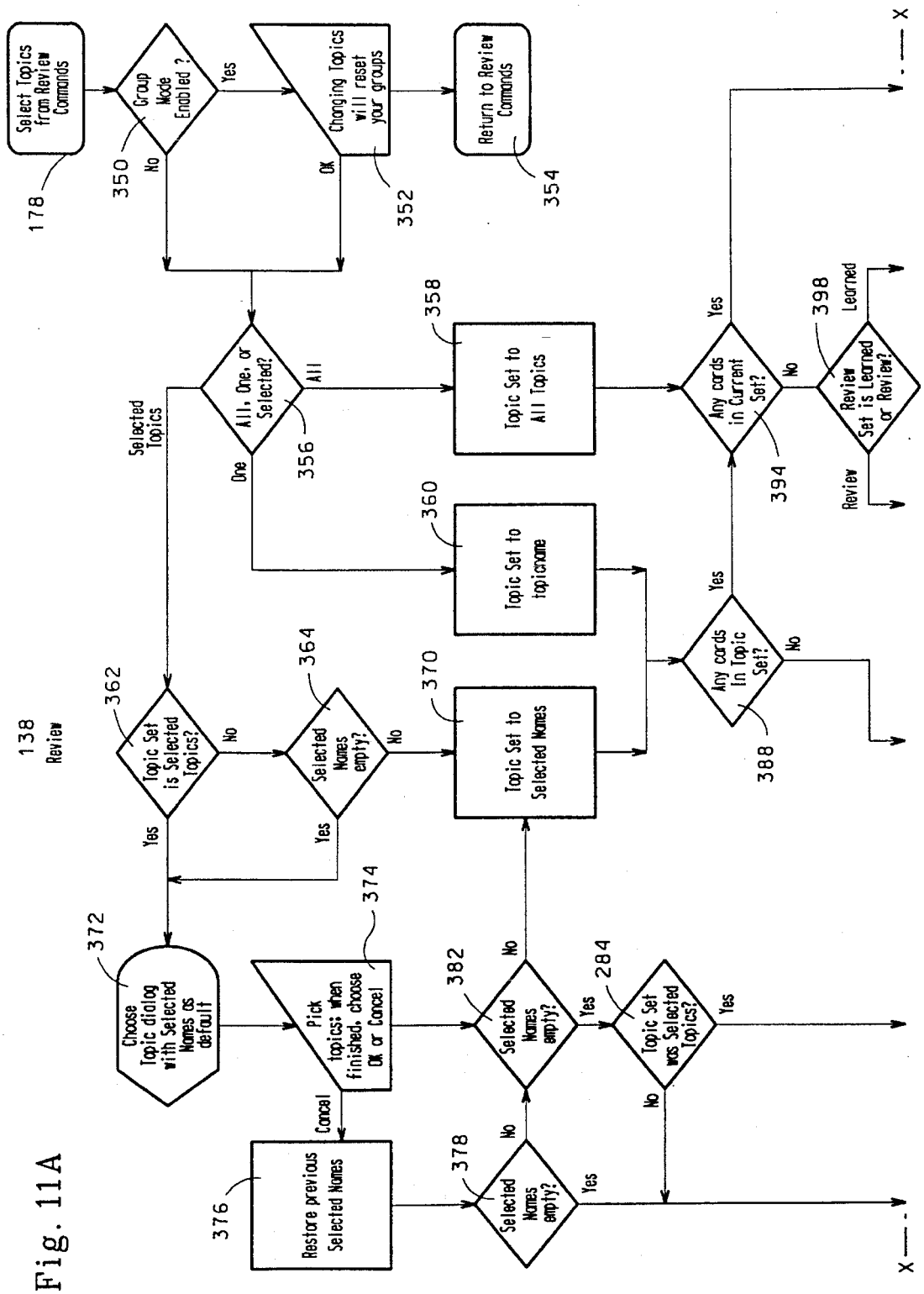
FIG. 11 is a flow chart expanding upon a portion of the flow chart of FIG. 6.
Figure 11B:
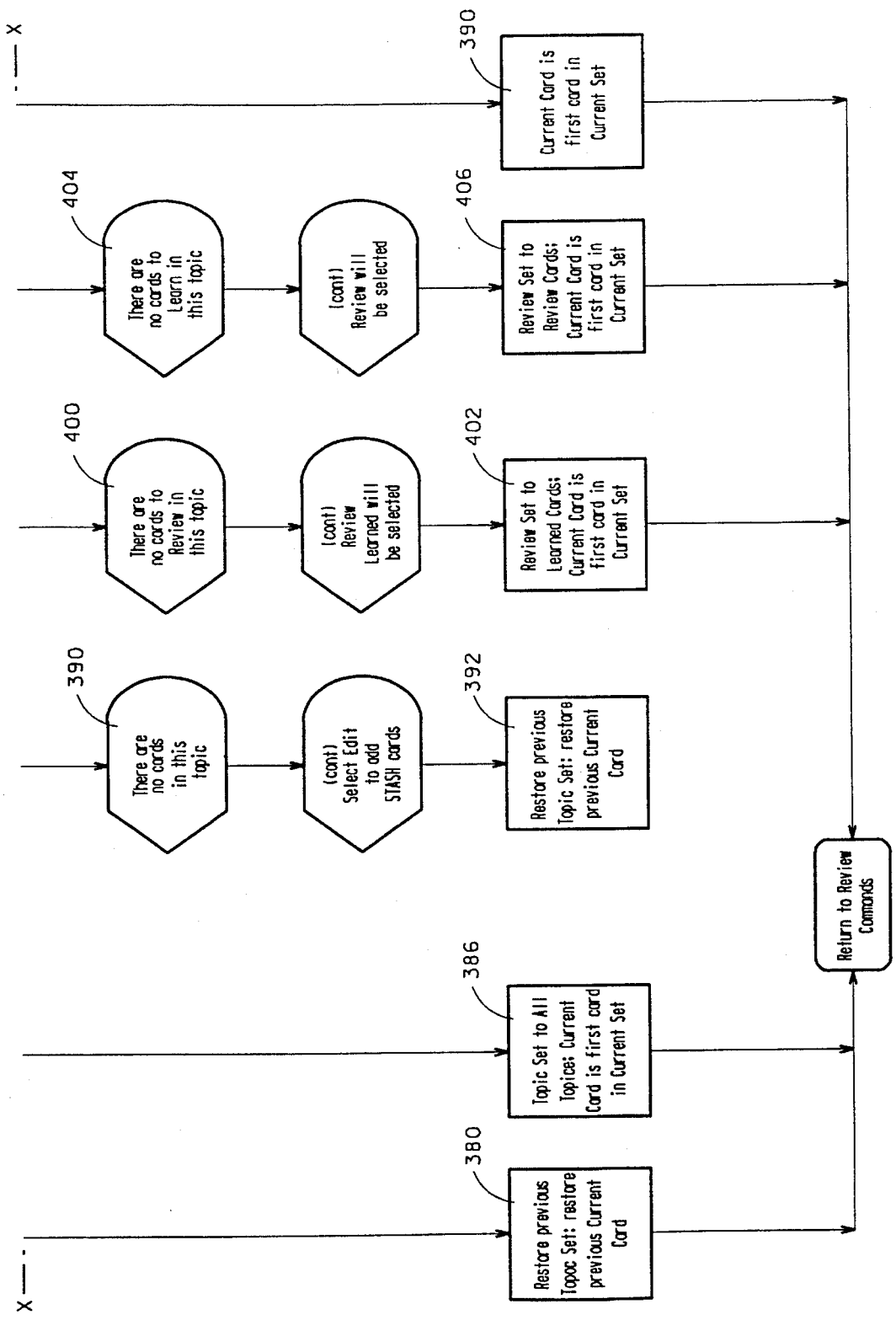

Should it be determined that the user input at 108 was to request that topics be selected, then the methodology of the flow chart of FIG. 11 is implemented. At 350 inquiry is made whether the group mode has been enabled. If yes, then a message is displayed on monitor 14 at 352 advising that changing topics will also reset the groups, because of the possibly different number of cards and their status, and a user input is therefore requested. Should the user elect to cancel the topic change, then the flow chart of FIG. 6 is returned to at 354. Should the answer to 350 be no or should the user input at 352 be other than cancel, then the determination is made at 356 whether the user desires to review all topics, a single topic, or selected topics.

Figure 12:
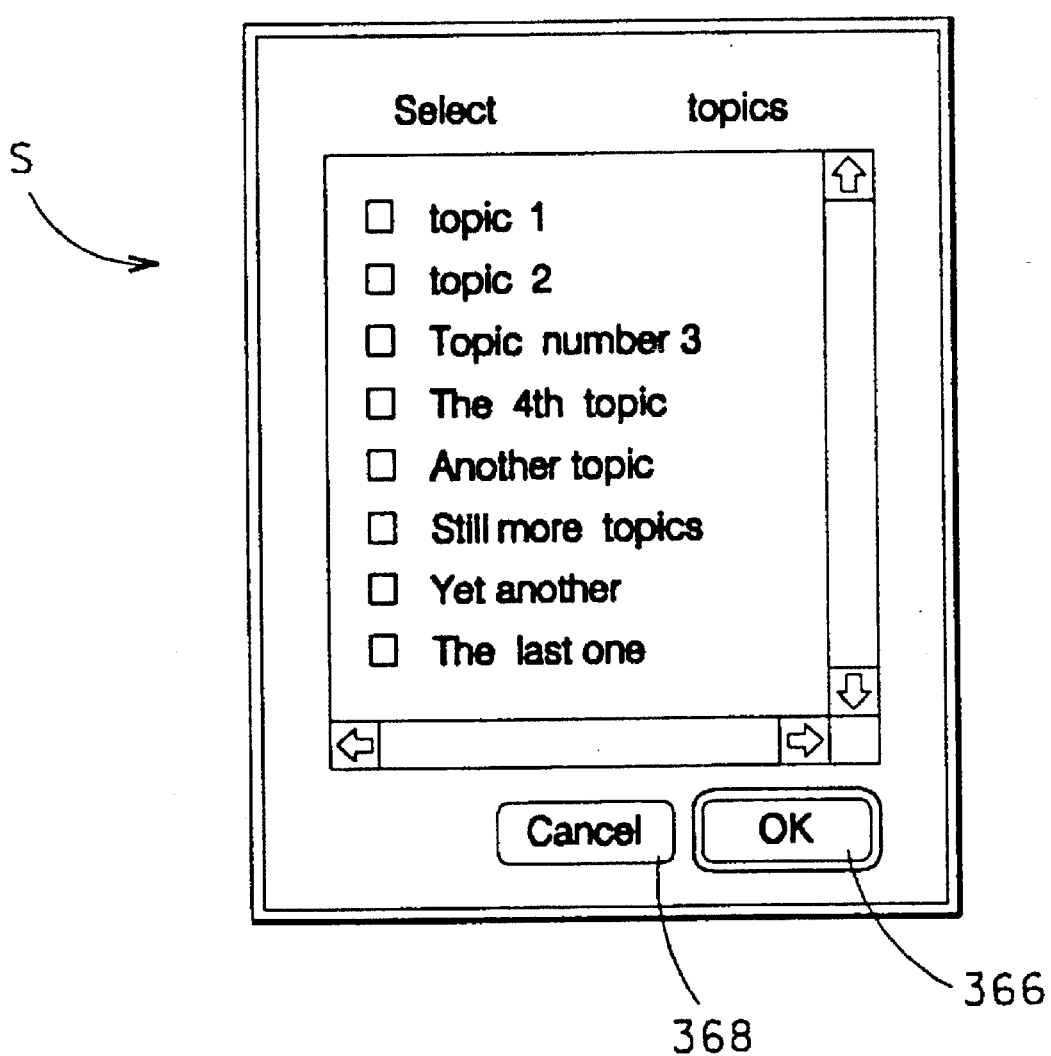
FIG. 12 is another computer screen generated in implementation of the flow chart of FIG. 11.

If the answer to 356 is all topics, then at 358 the topic set is comprised of all topics, and box 32 is updated. Should the user instead have clicked on a single topic by scrolling through the pop-up menu reached by clicking on the topic box 32, then the topic which was clicked on is set at 360 and the topic window 32 updated to indicate that topic. Should the user have scrolled through the topic menu to the "selected topics" option, then that is determined at 362. Inquiry is made at 364 whether names have been selected. FIG. 12 illustrates an exemplary screen S displayed to the user for selecting topics. The user, by holding the shift key and scrolling through the topics of screens, may set select topics for review by clicking the OK box 366. Alternatively, by clicking on the cancel box 368, the user may return to the review screen. Should it be determined at 364 that the selected names screen S of FIG. 12 is not empty, then the topic box 32 is set at 370 for "selected names".

Should the answer to 362 be yes, then a message is displayed to the user through monitor 14 at 372 advising that the topics to be reviewed may be chosen. The user input at 374 causes the thus selected topics to be set for review. Should the user instead click on the cancel button 368, then at 376 any previously selected topics continue to be the topics to be reviewed. Inquiry is made at 378 whether the selected names of screen S is empty, and if yes then the previous topic set is restored at 380. Should it be determined at 382 that the selected names of screen S is empty, then inquiry is made at 384 whether the topic set was selected topics. If yes, then the topic box 32 is set for all topics at 386.

At 388 inquiry is made whether there are any cards in the topic set. If no, then a message is displayed to the user through monitor 14 at 390 that there are no cards in the topic, and that the edit mode must be selected, through the review menu of FIG. 18, in order to create cards for that topic. The previous topic set is restored at 392 if the edit mode is not selected.

Inquiry is made at 394 whether there are any cards in the current set. If yes, then the current card is set as the first card in the set at 396. If no, then the determination is made at 398 whether the review is to be of learned cards or unlearned cards. If the review mode is set, then a message will be displayed on monitor 14 to the user at 400 that there are no unlearned cards to review, and that learned cards will therefore be reviewed. At 402 the review is set of learned cards, and the current card set as the first card in the set. Should the answer to 398 be that learned cards have been selected, then a message is displayed to the user on monitor 14 at 404 that there are no unlearned cards in the topic, and program is set to review unlearned cards at 406.

Figure 14:
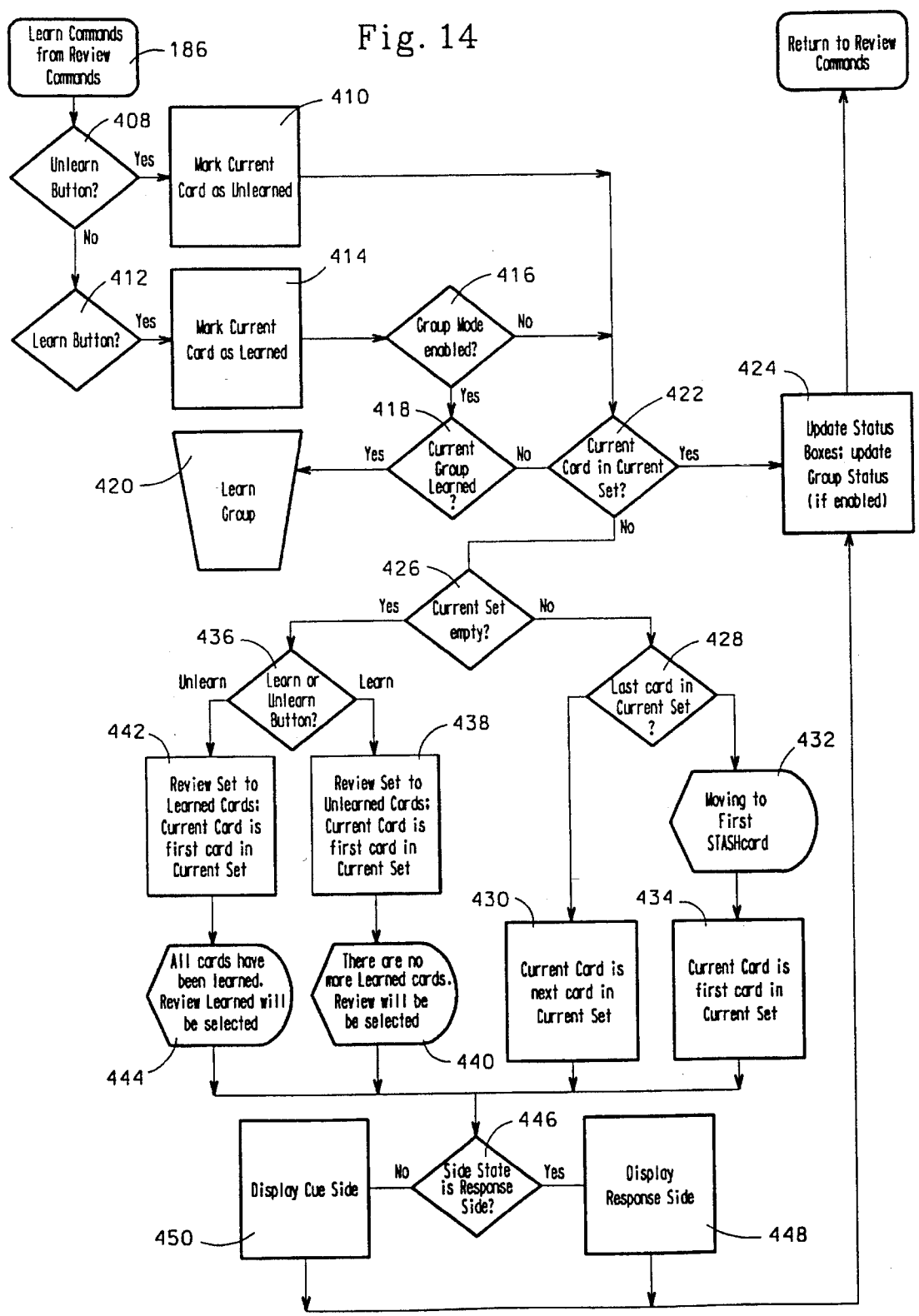
FIG. 14 is a flow chart expanding upon the flow chart of FIG. 6.
Figure 15:
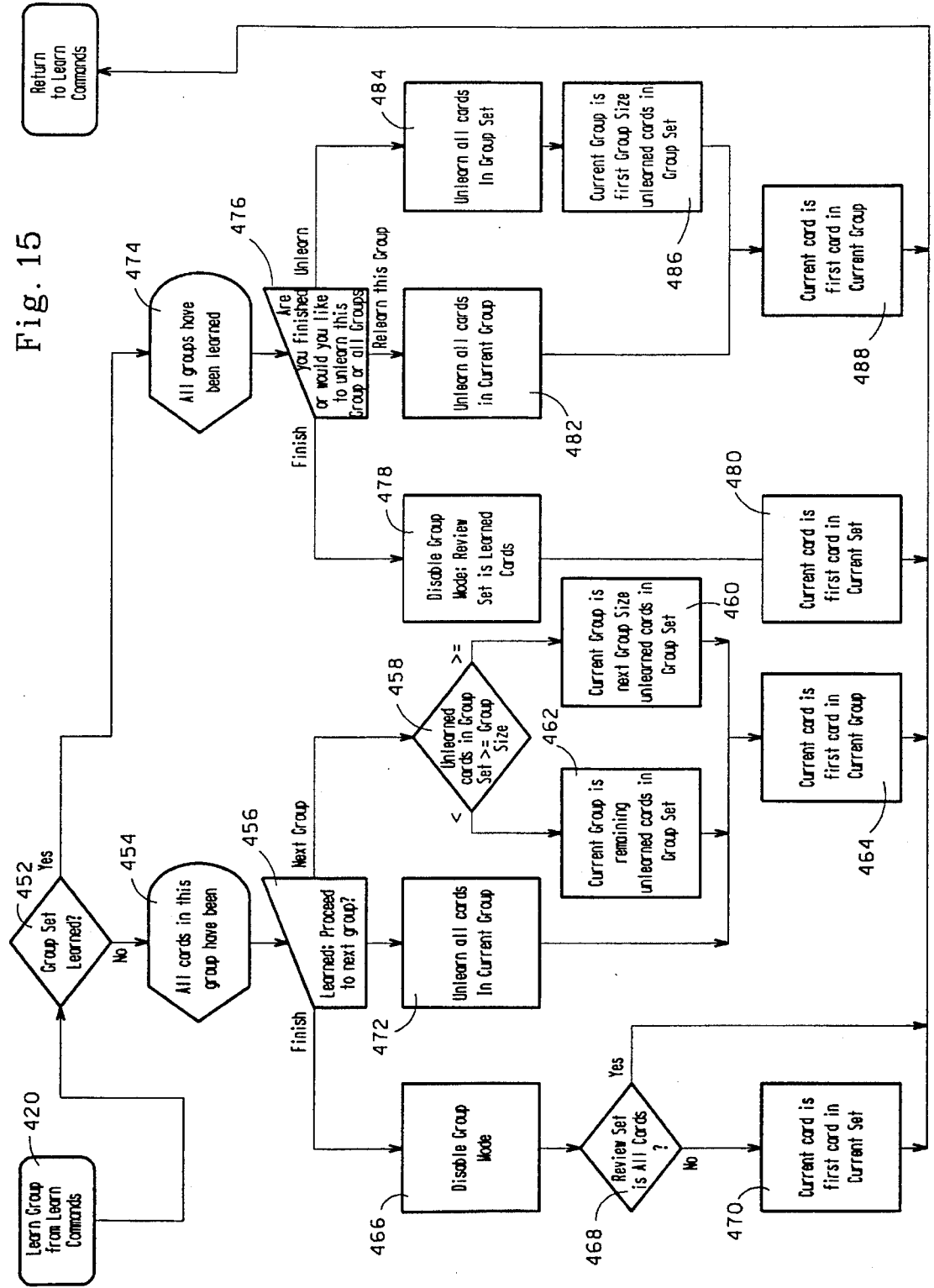
FIG. 15 is a flow chart expanding upon a portion of the flow chart of FIG. 14.

Once it is determined at 184 that the user input at 108 had been to click on one of the radio buttons 64 and 68, then the determination, is made in FIG. 14 at 408 whether button 90 is set for "unlearned". As earlier explained with regard to FIG. 3, this status is set by clicking on portion 68. If yes, then clicking on button 90 will cause learned cards to be marked unlearned at 410. Should instead the user have clicked on radio button 64, then the determination is made at 412 that button 90 is for cards which have been learned. Clicking on button 90 will cause unlearned cards to be marked as learned at 414. Once a card is marked as learned at 414, then inquiry is made at 416 whether group mode is enabled. If yes, then inquiry is made at 418 whether the current group has been learned. If yes, then the learned group commands 420 of FIG. 15 are implemented.

Should the answer at 418 be no, then inquiry is made at 422 whether the current card is in the current set. If yes, then the status boxes 64 and 68 are updated at 424. If the answer at 422 is no, then the inquiry is made at 426 whether the current set is empty. If no, then at 428 the determination is made whether the current card is the last card in the current set. If the answer to 428 is no, then at 430 the new current card is set as the next card in the current set. If the answer to 428 is yes, however, then a message is displayed on monitor 14 to the user at 432 advising that the program is proceeding to the first card in the set, and the new current card is set as the first card in the current set at 434.

Should it be determined at 426 that the current set is empty, then at 436 the determination is made whether the learned or unlearned button 90 has been pressed. If the learned button, then at 438 review is set to unlearned cards, with the current card being the first card in the current set. A message is displayed on monitor 14 at 440 that there are no more learned cards, and that the review will be of unlearned cards. Should the unlearned button 90 have been pushed at 436, on the other hand, then the review is set to learned cards at 442 with the current card being set as the first card in the current set. A message is displayed on monitor 14 at 444 advising that all cards have been learned, and that the review will be of learned cards.

The determination is made at 446 whether the show menu of FIG. 19 has been set for response side. If yes, then at 448 the response side 36 is set for display at 448, with the cue side 34 being set for display at 450.

Should it be determined at 418 that all cards in the current group have been learned, then at 452 of FIG. 15 the determination is made whether the group set has been learned. This is because there may be more than one group in a set, so that learning all cards in a given group does not mean that all cards in that set are learned. Should the answer at 452 be no, then a message is displayed on monitor 14 to the user at 454 that all cards in that group have been learned and asking the user to provide an input whether the next group should be proceeded to, the same group should be relearned, or the user is finished learning this group.

Should the user input at 456 be to proceed to the next group, then at 458 the determination is made whether the unlearned cards in the group set exceed or equal the group size. Should the answer at 458 be that the unlearned cards in the set exceed or equal the group size, then at 460 the current group is indicated as being the next group size of unlearned cards in the group set. Should the answer at 458, on the other hand, be that there are fewer unlearned cards than the group size, then at 462 the current group is indicated as being only those cards which remain. The current card is then set as the first card in the current group at 464.

Should the user response at 456 be to indicate finish, then the group mode is disabled at 466, and the determination is made at 468 whether the review is set for all cards. If no, then the current card is set as the first card in the set at 470.

Should the user response to 456 be to relearn this group, then all cards in the current group are caused to be unlearned at 472. Those skilled in the art will recognize that the user input to 456, as with the previous user inputs, is accomplished by positioning the cursor on the appropriate displayed response, and then clicking the mouse 20. This causes that response to be activated. While we prefer the use of mouse 20 for this purpose, those skilled in the art will recognize that a touch screen, dedicated key of keyboard 16, or the like, could be used for this purpose.

Should it be determined at 452 that the group set has been learned, then a message is displayed on monitor 14 to the user at 474 that all groups have been learned, and the user is asked whether he or she is finished or would like to relearn the previous group or all groups. Should the user response at 476 be to finish, then group mode is disabled at 478, and review is set for learned cards. The current card is then set as the first card in the current set at 480. Should the user response be to relearn the previous group, then at 482 all cards in the current group are set to unlearned. Should the user response be to relearn all groups, then all cards in the set are set to unlearn at 484. At 486 the current group is set to be those first unlearned cards in the group set equal to the group size. At 488 the current card is then set as the first card in the current group.

Figure 13:
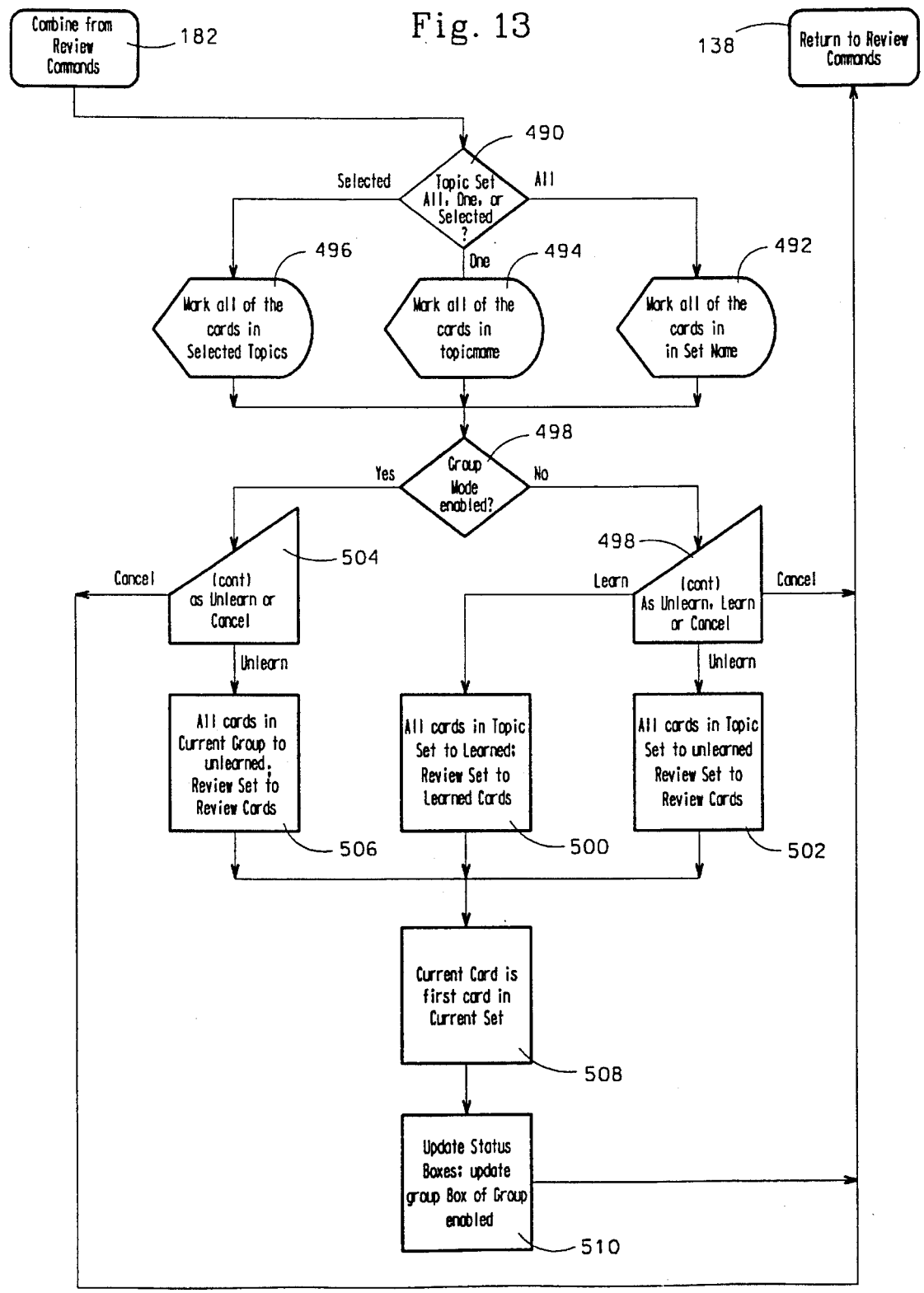
FIG. 13 is a flow chart expanding upon the flow chart of FIG. 6.

FIG. 13 illustrates the process utilized when the user input at 108 is to actuate the combine command of the review menu at FIG. 18. When the combine command is recognized at 182, then at 490 the determination is made whether the topic set 32 is all topics, selected topics, or only one selected topic.

If all topics are being reviewed, then at 492 a message is displayed to the user on monitor 14 asking whether all cards in the set should be marked as learned, unlearned, or whether combine should be cancelled. Should only one topic be reviewed, then at 494 the message asks whether all cards should be marked unlearn or whether combine should be cancelled. At 496 the message is displayed asking whether all cards in the selected topics should be marked as unlearned or whether combine should be cancelled.

The determination is made at 498 whether the group mode is enabled. If no, should the user input in response to the messages of 492, 494, or 496 be "cancel", then the system returns to 138. If the user input is "learn", then at 500 all cards in the topic set are marked as learned and the review is to be of learned cards If the user input at 498 is "unlearn", then at 502 all cards in the topic set are marked unlearned, and the review proceeds of them.

Should group mode be enabled and if the user input at 504 is "cancel", then the system returns to 138. Should the user input be "unlearn", then all cards in the current group are set to unlearn at 506, and the review proceeds of those cards. At 508 the current card is set as the first card in the current set, and at 510 the status boxes are updated.

Operation of the invention through use of the computer 10, keyboard 16, and mouse 20 is easily implemented through the graphic interface which is provided by the operating system. As an initial matter, the user must create a set of the simulated cards, and may, if desired, create topics or subsets within that set. Creation of the flashcards requires that the system be in the edit mode of operation, which is achieved through implementing the review menu.

Once the user has selected a name for the set of cards, then the name of a topic may be selected based upon a criteria determined by the user. For example, in FIG. 2, the criteria is indicated at 32 and 38 as relating to "The Ape Family" with all cards in the set related as pertaining to "Monkey". After the set and topic have been selected and entered, the user enters through keyboard 16 the items of in,formation pertaining to the cue side 34. The items of information making up the cue side need not end in a question mark, and the response side 36 is implemented by pressing the "tab" key on keyboard 16. By repetition of this process, the user will create a plurality of flashcards within the designated set, and likewise may create a plurality of flashcards for each topic.

Once a set of cards has been entered or otherwise input into the personal computer 10, then those cards may be reviewed through implementation of the review mode of the system. The review mode is accessed by opening the review menu of FIG. 18 and clicking upon the review box (the edit box is shown in FIG. 18, because the system is set for review. If in the edit mode, then review would instead be displayed). Once the review mode has been implemented, then the user need merely designate which set or sets are to be reviewed, and which topic or topics within each such set.

When in the review mode, the user through the keyboard 16 or the mouse 20 may elect whether to learn unlearned flashcards, or may learn or "unlearn" those which have been previously marked as learned. The user may combine topics, and may enable the group mode in order to review a selected number of cards during any given session. Additionally, pursuant to the screen of FIG. 18, the user may review the cards in alphabetical order based upon the cue side 34, in numerical sequence as shown at 40 and 74, or in a random order. Also, clicking on the auto box of FIG. 18 causes the cards to be reviewed at a rate selected by the user, so that only a given time per card is available for review. In addition, the user may elect to review only the cue sides 34, the response sides 36, or both sides.

It can be seen that the disclosed invention not only enhances the ability of the user to learn information through the initial selection process in which the cue sides 34 and response sides 36 are created, but learning is furthermore enhanced because of the various display options which the user may readily and easily implement in order to make efficient use of his or her time. Thus, the disclosed invention permits the personal computer system PC to be used in a manner which enhances the learning capabilities of the user while minimizing possibilities of boredom, extraneous information, and wasted time.

While this invention has been described as having a preferred design, it is understood that it is capable of further modifications, uses and/or adaptations, following the general principle of the invention and including such departures from the present disclosure has come within known or customary practice in the art to which the invention pertains, and as may be applied to the central features hereinbefore set forth, and fall within the scope of the invention of the limits of the appended claims.

What we claim is:

1. A method of displaying information for learning purposes in a computer, comprising the steps of:
    a) providing within a computer an information set of simulating a set of flashcards including at least a first information group, the first information group including a plurality of discrete information elements each having a first cue portion and a related second response portion;
    b) providing each of the first and second portions of the discrete information elements based upon a user input of user selected information;
    c) segregating and arranging within the computer the information elements in a predetermined user selected sequence;
    d) displaying with a display operably associated with the computer at least one of the user preselected first and second portions of the discrete information elements in the selected sequence; and
    e) the discrete information elements being displayed with the display at a rate based upon a rate selected by the user from the group consisting of time-based and user activation-based.

2. The method of claim 1, including the steps of:
    a) arranging for display within the computer a preselected number of the discrete information elements for display in the predetermined sequence; and
    b) displaying the preselected number of discrete elements in the predetermined sequence.

3. The method of claim 2, including the step of:
    a) selecting the discrete information elements of the preselected number based upon a predetermined orientation of the discrete information elements.

4. The method of claim 3, including the steps of:
    a) orienting the discrete information elements in a numerical progression; and,
    b) arranging the discrete elements based upon the numerical progression.

5. The method of claim 4, including the step of:
    a) arranging the discrete information elements based upon the numerical progression and upon each discrete information element satisfying a predetermined user selected criteria.

6. The method of claim 1, including the step of:
    a) selecting as the predetermined sequence a sequence chosen from the group consisting of the order in which the discrete information elements were input into the computer, random order, and alphabetical order.

7. The method of claim 1, including the step of:
   a) selecting as the preselected portion one of a question and an answer.

8. The method of claim 1, including the step of:
   a) selecting a second user selected predetermined sequence, and causing the discrete information elements to be arranged within the computer in the second user selected predetermined sequence.

9. A method of using simulated flashcards in a computer for learning purposes, comprising the steps of:
   a) inputting into a computer a plurality of information elements simulating a set of flashcards, each simulated flashcard having an information containing cue portion and a related information containing response portion;
   b) segregating the simulated flashcards into a plurality of user selected discrete groups, the information elements of each group being related;
   c) arranging within the computer in a user selected preselected sequence at least some of the simulated flashcards of at least one of the groups;
   d) predetermining the number of simulated flashcards to be displayed by the user; and
   e) displaying with a display operably associated with the computer in the preselected sequence at least one of the preselected cue portion and response portion of the arranged simulated flashcards, the flashcards being displayed at a rate based upon a user selected one of time and user activation.

10. The method of claim 9, including the step of:
    a) displaying as the preselected portion the information elements selected from the group consisting of the cue portion, the response portion, and the cue and response portions.

11. The method of claim 9, including the step of:
    a) selecting the simulated flashcards satisfying the predetermined number from those flashcards satisfying a user selected preselected criteria.

12. The method of claim 10, including the step of:
    a) selecting the simulated flashcards satisfying the predetermined number from those flashcards satisfying a user selected preselected criteria chosen from the group consisting of those simulated flashcards which have not been learned, those simulated flashcards which have been learned, and all simulated flashcards.

13. The method of claim 12, including the step of:
    a) displaying the selected simulated flashcards in a sequence selected from the group consisting of the order in which the simulated flashcards were entered into the computer, random order, and alphabetized order based upon the information elements of the cue portions.

14. A method of displaying information for learning purposes in a computer, comprising the steps of:
    a) entering manually into a computer a plurality of information elements simulating a set of flashcards, the information elements of each simulated flashcard comprising an information containing cue portion and a related information containing response portion;
    b) segregating the simulated flashcards into a plurality of user selected discrete groups, the information elements of the cue portion of each group being related based upon a user selected criteria;
    c) arranging within the computer based upon a user selected preselected sequence at least some of the simulated flashcards of at least one group;
    d) displaying sequentially to the user with a display operably associated with the computer in the preselected sequence a preselected portion of the arranged simulated flashcards, the simulated flashcards being displaced based upon a user selected determination of one of time and user activation; and,
    e) indicating to the computer those simulated flashcards which the user has learned and segregating those displayed simulated flashcards which have been learned from those simulated flashcards which have not been learned.

15. The method of claim 14, including the step of:
    a) arranging in the preselected sequence the simulated flashcards based upon a user selected criteria chosen from the group consisting of all simulated flashcards in the set, all simulated flashcards of a single topic, and all simulated flashcards of selected topic.

16. The method of claim 14, including the step of:
    a) arranging in the preselected sequence the simulated flashcards based upon a user selected criteria chosen from the group consisting of all simulated flashcards which have not been learned, all simulated flashcards which have been learned, and all simulated flashcards in the set.

17. The method of claim 14, including the step of:
    a) arranging the simulated flashcards in a user selected preselected sequence chosen from the group consisting of the order in which the simulated flashcards were entered into the computer, random order, and alphabetized order based upon the information elements of the cue portion.

18. The method of claim 14, including the step of:
    a) displaying no more than a preselected number of simulated flashcards.

* * * * *